US012587292B2

(12) United States Patent
Sekiya et al.

(10) Patent No.: US 12,587,292 B2
(45) Date of Patent: Mar. 24, 2026

(54) VEHICLE UNIT AND POSITIONAL RELATIONSHIP IDENTIFICATION SYSTEM

(71) Applicant: DENSO CORPORATION, Kariya-city (JP)

(72) Inventors: Youhei Sekiya, Nisshin-city (JP); Kenichiro Sanji, Kariya-city (JP); Yuuji Kakuya, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 327 days.

(21) Appl. No.: 18/336,171

(22) Filed: Jun. 16, 2023

(65) Prior Publication Data

US 2023/0336256 A1    Oct. 19, 2023

Related U.S. Application Data

(63) Continuation of application No. PCT/JP2021/041720, filed on Nov. 12, 2021.

(30) Foreign Application Priority Data

Dec. 21, 2020    (JP) ................................. 2020-211523

(51) Int. Cl.
H04B 17/318    (2015.01)
H04B 17/21    (2015.01)

(52) U.S. Cl.
CPC ......... H04B 17/318 (2015.01); H04B 17/221 (2023.05)

(58) Field of Classification Search
CPC ...... H04B 17/221; H04B 17/318; H01Q 1/32;
H01Q 21/24; H01Q 1/3275; H01Q 1/42;
H01Q 21/062; H01Q 21/065; H01Q
21/08; H01Q 9/40; H01Q 9/42
USPC ....... 370/329, 367, 324, 252, 338, 330, 297,
370/342, 280
See application file for complete search history.

(56) References Cited

U.S. PATENT DOCUMENTS

| | | | |
|---|---|---|---|
| 2006/0025897 A1* | 2/2006 | Shostak ............. | G06K 19/0717 |
| | | | 701/1 |
| 2006/0284839 A1* | 12/2006 | Breed ................... | B60W 50/16 |
| | | | 345/156 |
| 2007/0156312 A1* | 7/2007 | Breed ................. | B60C 23/0408 |
| | | | 701/31.4 |

(Continued)

FOREIGN PATENT DOCUMENTS

| | | |
|---|---|---|
| JP | 2016124477 A | 7/2016 |
| JP | 2016125884 A | 7/2016 |

(Continued)

*Primary Examiner* — Joseph Arevalo
(74) *Attorney, Agent, or Firm* — Harness, Dickey & Pierce, P.L.C.

(57)    ABSTRACT

A vehicle unit installable and usable in a vehicle, includes, at least one vehicle antenna transmitting and receiving a high-frequency signal, which is a signal carried on a high-frequency radio wave, and the vehicle antenna includes, a vertically polarized wave antenna capable of transmitting and receiving a polarized wave orthogonal to a target surface, which is a metal surface at a predetermined part of the vehicle, and first and second horizontally polarized wave antennas each capable of transmitting and receiving polarized waves that are horizontal to the target surface and mutually orthogonally polarized.

10 Claims, 6 Drawing Sheets

(56) References Cited

U.S. PATENT DOCUMENTS

| 2008/0086240 | A1* | 4/2008 | Breed .................... G07C 5/008 |
| | | | 701/1 |
| 2010/0207754 | A1* | 8/2010 | Shostak ............. B60C 23/0433 |
| | | | 340/572.1 |
| 2010/0303127 | A1* | 12/2010 | Akiyama ............ H04B 1/7163 |
| | | | 375/E1.001 |
| 2012/0089299 | A1* | 4/2012 | Breed ................... B60R 21/013 |
| | | | 701/1 |
| 2013/0142136 | A1* | 6/2013 | Pi ...................... H04B 7/15507 |
| | | | 370/329 |
| 2018/0292521 | A1* | 10/2018 | Saitou ...................... G01V 3/12 |
| 2019/0229411 | A1 | 7/2019 | Sugimoto et al. |
| 2022/0043100 | A1 | 2/2022 | Sanji et al. |
| 2022/0091245 | A1* | 3/2022 | Destefano ............... G01S 7/292 |
| 2022/0376771 | A1* | 11/2022 | Fujii .................. H04B 7/18504 |
| 2022/0393341 | A1* | 12/2022 | Shams ................... H01Q 21/28 |
| 2023/0096365 | A1* | 3/2023 | Mikami .................. H04B 1/38 |
| | | | 370/316 |

FOREIGN PATENT DOCUMENTS

| JP | 2018061137 A | 4/2018 |
| JP | 2019-083403 A | 5/2019 |
| JP | 2020182158 A | 11/2020 |

* cited by examiner

VEHICLE UNIT AND POSITIONAL RELATIONSHIP IDENTIFICATION SYSTEM

CROSS REFERENCE TO RELATED APPLICATION

The present application is a continuation application of International Patent Application No. PCT/JP2021/041720 filed on Nov. 12, 2021, which designated the U.S. and claims the benefit of priority from Japanese Patent Application No. 2020-211523 filed on Dec. 21, 2020. The entire disclosures of all of the above applications are incorporated herein by reference.

TECHNICAL FIELD

The present disclosure relates to a vehicle unit and a positional relationship identification system.

BACKGROUND

Conventionally, a device to identify a positional relationship of a portable device with respect to a vehicle has been developed.

SUMMARY

According to an aspect of the present disclosure, a vehicle unit is installable and usable in a vehicle. The vehicle unit comprises an antenna portion configured to transmit and receive a high-frequency signal carried on a high-frequency radio wave.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
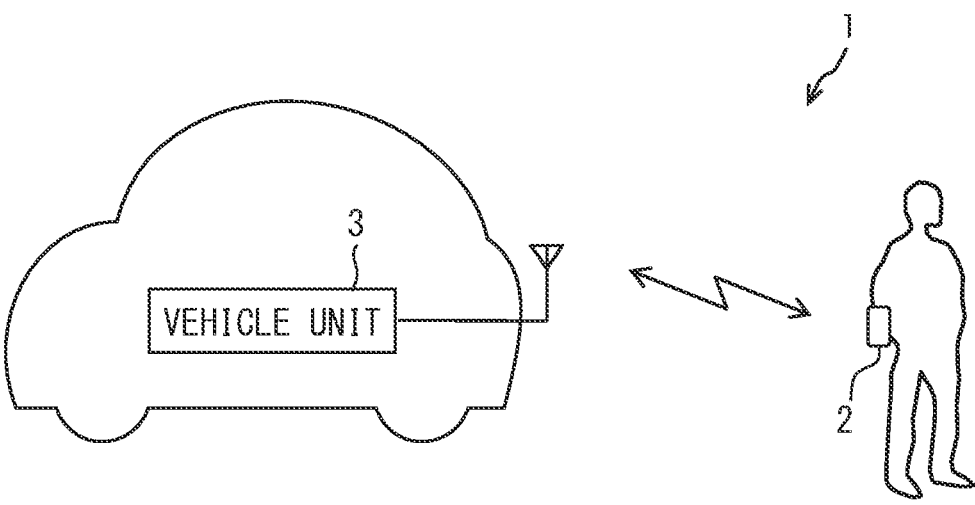
FIG. 1 is a diagram showing an example of a schematic configuration of a vehicular system.

Hereinafter, examples of the present disclosure is described.

According to an example of the present disclosure, a portable device carried by a user and a vehicle unit including an antenna provided on a vehicle side transmit and receive radio waves therebetween to identify a positional relationship of a portable device with respect to a vehicle.

According to an example of the present disclosure, the position of a portable device may be determined based on RSSI of request signals transmitted as LF band radio waves from antennas arranged at a plurality of positions on a vehicle. In this example, the position of the portable device is determined by the principle of triangulation using the fact that the RSSI correlates with the distance between the portable device and the antenna.

When using a multifunctional portable phone or the like as a portable device, it is conceivable to use communications in accordance with communication standards using high-frequency radio waves such as Bluetooth (registered trademark) Low Energy (hereinafter referred to as BLE) as communications between the portable device and the vehicle unit. Radio waves in the LF band have a frequency of 125 kHz, which is low. Therefore, attenuation in radio wave propagation is small, and insufficient strength is less likely to occur. On the other hand, when high-frequency radio waves are used, attenuation in radio wave propagation is large, and strength may become insufficient. In particular, in a case where the antenna of the portable device is a single-axis antenna, the direction of the antenna changes arbitrarily. Therefore, radio waves having sufficient strength for an estimation of the positional relationship of the portable device may be not receivable in some cases.

According to an example of the present disclosure, a vehicle unit is configured to be installed and used in a vehicle. The vehicle unit includes at least one antenna portion configured to transmit and receive a high-frequency signal that is a signal carried on high-frequency radio waves. The antenna portion at least includes a vertically polarized wave antenna configured to transmit and receive a polarized wave that is orthogonal to a target surface, which is a metal surface of a predetermined part of the vehicle, and one or two horizontally polarized wave antennas each configured to transmit and receive polarized waves that are horizontal to the target surface and are orthogonal to each other, i.e., mutually orthogonally polarized.

In such manner, the configuration enables to increase the number of directions to at least mutually orthogonal, three axial directions or more in which polarized waves are easily receivable by the antenna portion that transmits and receives high-frequency signals carried on high-frequency radio waves.

When it becomes easy to at least receive polarized waves in mutually orthogonal, three axial directions, it becomes easy to receive high-frequency signals with high reception strength even when the direction of polarized waves from a transmission source of the high-frequency signal changes. Therefore, even if the high-frequency signal is attenuated, it becomes easier to receive electric power of desired strength. As a result, even when high-frequency radio waves are used to identify the positional relationship of the portable device with respect to the vehicle, it is possible to more easily receive electric power of desired strength.

According to another example, a positional relationship identification system includes the above-described vehicle unit and a portable device that is carried by a user and configured to transmit and receive a high-frequency signal that is a signal carried on high-frequency radio waves.

In such manner, since the above-mentioned vehicle unit is included, even when high-frequency radio waves are used to identify the positional relationship of the portable device with respect to the vehicle, the configuration facilitates to receive electric power of desired strength.

Multiple embodiments are described with reference to the drawings. For convenience of description, among multiple embodiments, a configuration having the same function as a configuration shown in the drawing and described in the previous embodiment may be indicated by the same reference symbol, and the description thereof may be omitted. Description in another applicable embodiment may be referred to for such a portion denoted by the identical reference sign.

<Configuration of Vehicular System 1>

As shown in FIG. 1, a vehicular system 1 includes a portable device 2 carried by a user and a vehicle unit 3 used in a vehicle. A condition "carried by a user" does not limitedly indicate a state of being carried by the user but also includes a state of not being carried by the user, but being left behind. "Used in a vehicle" is not limited to being mounted on a vehicle, but also includes a state before being mounted on a vehicle. This vehicular system 1 corresponds to a positional relationship identification system.

The portable device 2 and the vehicle unit 3 are each configured to transmit and receive signals via wireless communications. When the portable device 2 and the vehicle unit 3 exist within a communicable range from each other, a signal transmitted by one of them is received by the other via wireless communications. Transmission and reception of signals by wireless communications between the portable device 2 and the vehicle unit 3 are carried out by transmitting signals on high-frequency radio waves. The high-frequency radio waves mentioned here may be radio waves of 1 GHZ or higher, for example. Further, the high-frequency radio wave may be a high-frequency radio wave used for wireless communications conforming to short-range wireless communication standards such as Bluetooth (registered trademark) Low Energy (hereinafter referred to as BLE) or the like. Hereinafter, a case where the portable device 2 and the vehicle unit 3 transmit and receive signals by wireless communications conforming to the short-range wireless communication standard of BLE (hereinafter referred to as BLE communications) is described as an example. In this case, the high-frequency radio waves are radio waves in the 2.4 GHz band.

<Schematic Configuration of Portable Device 2>

Figure 2:
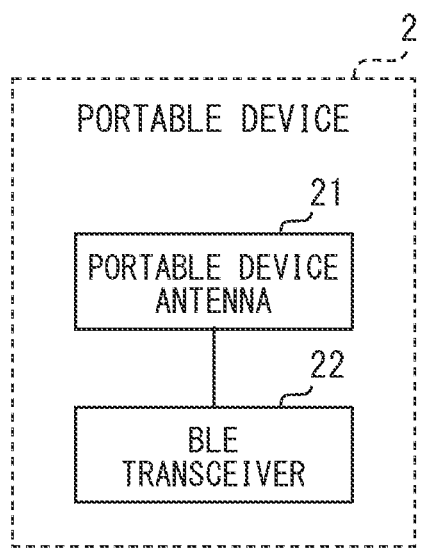
FIG. 2 is a diagram showing an example of a schematic configuration of a portable device.

Next, the portable device 2 is described with reference to FIG. 2. The portable device 2 may be a so-called fob or a multifunctional portable phone. In the following description, an example in which the portable device 2 is a multifunctional portable phone is described. As shown in FIG. 2, the portable device 2 includes a portable device antenna 21 and a BLE transceiver 22 for BLE communications.

The portable device antenna 21 receives transmitted signals from the vehicle unit 3 which is carried on high-frequency radio waves, and transmits signals which is carried on high-frequency radio waves. It is assumed that the portable device antenna 21 is implemented as, for example, a uniaxial antenna. The BLE transceiver 22 demodulates a signal received by the portable device antenna 21, modulates the signal, outputs the signal to the portable device antenna 21, and emits it as a high-frequency radio wave.

<Schematic Configuration of Vehicle Unit 3>

Figure 3:
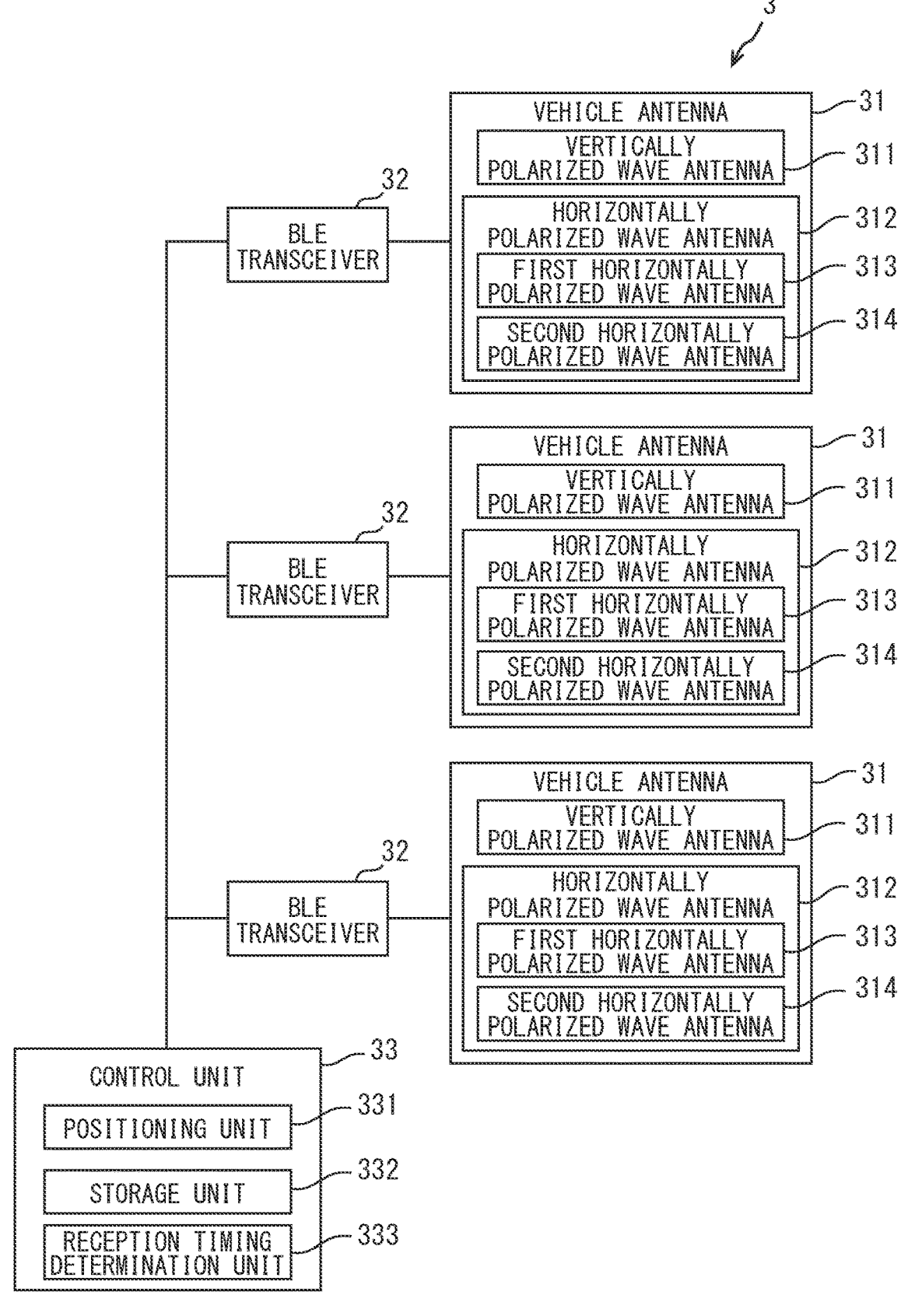
FIG. 3 is a diagram showing an example of a schematic configuration of a vehicle unit.

Next, a schematic configuration of the vehicle unit 3 is described with reference to FIG. 3. As shown in FIG. 3, the vehicle unit 3 includes a vehicle antenna 31, a BLE transceiver 32 and a control unit 33.

The vehicle antenna 31 receives transmitted signals which is carried on high-frequency radio waves from the portable device 2, and transmits signals which are carried on high-frequency radio waves. The vehicle antenna 31 corresponds to an antenna. The vehicle antenna 31 is providable and usable in a vehicle. The vehicle antenna 31 is installed on a part of a surface of the vehicle. The vehicle antenna 31 may be provided inside a vehicle compartment, or may be provided on an outer surface of the vehicle. For example, the vehicle antenna 31 may be configured to be installed on a pillar, bumper, door handle, roof, door mirror, back door, or the like. One vehicle antenna 31 may be provided in one vehicle, or a plurality of vehicle antennas 31 may be provided in one vehicle. In the present embodiment, a configuration, in which three vehicle antennas 31 are provided in a vehicle so that a position of the portable device 2 can be identified by the principle of triangulation, is described as an example.

As shown in FIG. 3, the vehicle antenna 31 includes a vertically polarized wave antenna 311 and a horizontally polarized wave antenna 312. The horizontally polarized wave antenna 312 includes a first horizontally polarized wave antenna 313 and a second horizontally polarized wave antenna 314. The vertically polarized wave antenna 311 and the horizontally polarized wave antenna 312 are, for example, arranged on the same plane. This is to prevent each of the antennas in the vehicle antenna 31 from interfering with each other's directivity. The vertically polarized wave antenna 311 and the horizontally polarized wave antenna 312 are arranged on a metal surface (hereinafter referred to as a target surface) at a predetermined part of the vehicle. That is, the vehicle antenna 31 is arranged on or above the target surface. The plurality of vehicle antennas 31 may be configured to be arranged on or above respectively different target surfaces. The predetermined part of the vehicle may be the aforementioned pillar, bumper, door handle, roof, door mirror, back door, and the like.

The vertically polarized wave antenna 311 and the horizontally polarized wave antenna 312 may be configured to be in contact with the target surface, and may be, for example, provided at a distance of λ/4 from the target surface. This is because the target surface can be used as a reflector to increase the gain of the antenna.

The vertically polarized wave antenna 311 is provided to be capable of transmitting and receiving polarized waves orthogonal to the target surface. As the vertically polarized wave antenna 311, a 0th-order resonance antenna may be used. This is to enable a low-profile antenna configuration. A 0th-order resonance antenna is an antenna having a flat plate structure that utilizes 0th-order resonance, which is an applied technology of metamaterials.

The 0th-order resonance antenna may be provided as an antenna including: a ground plate that is a plate-shaped conductor member; a patch section that is a plate-shaped conductor member installed to face the ground plate at a predetermined spacing; and a short-circuit portion that is a conductor member for electrically connecting the two. The ground plate may be connected to an outer conductor of a power supply cable, and may function as a ground. A feeding point may be provided at an arbitrary position in the patch section. Further, on one side of the patch section opposite to a side on which the ground plate is disposed, an additional conductor, which is a plate-shaped conductor member, may be provided to face the patch section with a predetermined spacing, and, by using (i) the inductance provided by the short-circuit portion, (ii) the electrostatic capacitance formed by the ground plate and the patch section, and (iii) the electrostatic capacitance formed by the patch section and the additional conductor, parallel resonance may be, for example, performed. Note that an inverted F-type antenna may be used as the vertically polarized wave antenna 311.

The horizontally polarized wave antenna 312 is provided to be capable of transmitting and receiving mutually orthogonal polarized waves that are horizontal to the target surface. The first horizontally polarized wave antenna 313 is provided to be capable of transmitting and receiving a horizontally polarized wave with respect to the target surface. The first horizontally polarized wave antenna 313 corresponds to a first horizontally polarized wave antenna. The second horizontally polarized wave antenna 314 is provided to be capable of transmitting and receiving a polarized wave that is horizontal to the target surface and that is orthogonal to the polarized wave transmittable and receivable by the first horizontally polarized wave antenna 313. The second horizontally polarized wave antenna 314 corresponds to a second horizontally polarized wave antenna. The antenna axes of the vertically polarized wave antenna 311, the first horizontally polarized wave antenna 313, and the second horizontally polarized wave antenna 314 are orthogonal to each other, or in other words, mutually orthogonal. That is, the vehicle antenna 31 has three-axis antennas orthogonal to each other. In the present embodiment, the configuration in which the vehicle antenna 31 has these three-axis antennas is described as an example, however, the vehicle antenna 31 may have more antennas.

Figure 4:
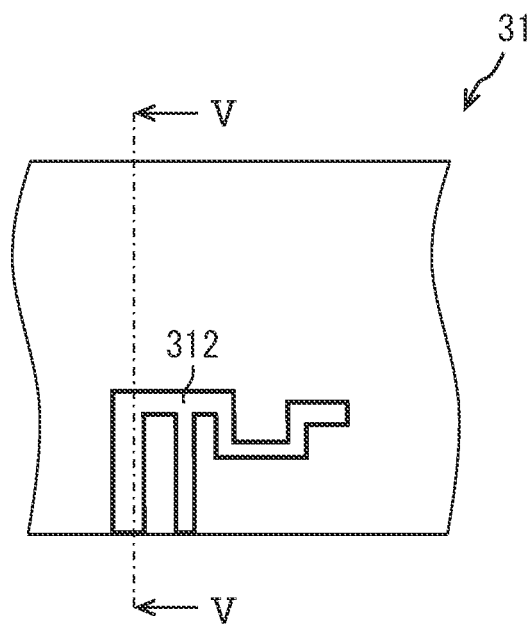
FIG. 4 is a top view partially showing a region where a horizontally polarized wave antenna is provided.
Figure 5:
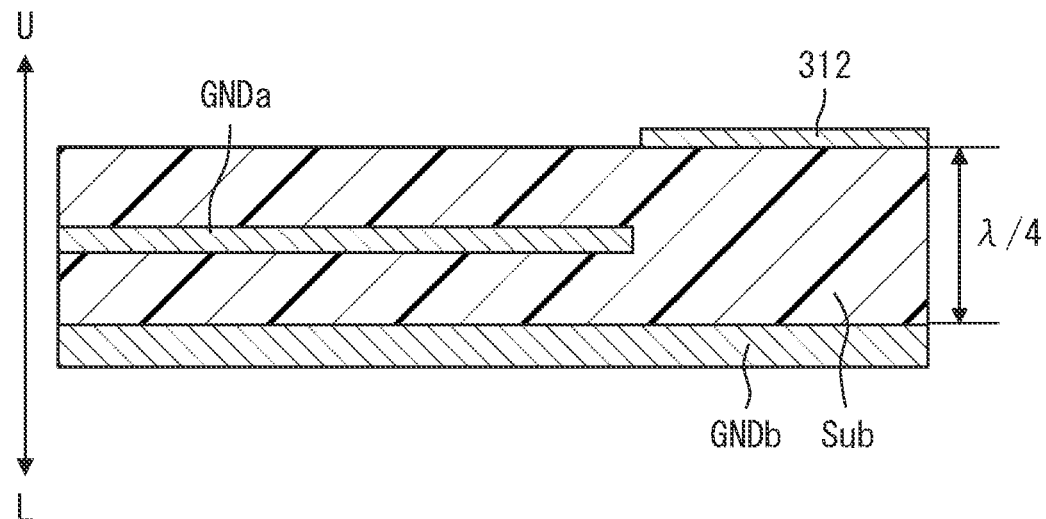
FIG. 5 is a cross-sectional view taken along a line V-V of FIG. 4.

The horizontally polarized wave antenna 312 may be, for example, a pattern antenna formed on a circuit board by printing or etching. Further, a ground layer may be, for example, formed right under the horizontally polarized wave antenna 312 as one of lower layers positioned closer to the target surface than a layer on which the horizontally polarized wave antenna 312 is provided. Here, it is illustrated by using FIG. 4 and FIG. 5. FIG. 4 is a top view partially showing a region where the horizontally polarized wave antenna 312 is provided. FIG. 5 is a cross-sectional view taken along a line V-V of FIG. 4. GNDa and GNDb in FIG. 5 are respectively a ground. Sub in FIG. 5 is a substrate. U in FIG. 5 indicates an upper layer side, and L indicates a lower layer side corresponding to a target surface side.

As shown in FIG. 5, a horizontally polarized wave antenna 312 is formed as a pattern antenna on a surface of the substrate Sub on the upper layer side. GNDa and GNDb are positioned below the layer in which the horizontally polarized wave antenna 312 is formed. GNDa is a ground to which the vertically polarized wave antenna 311 (not shown in FIGS. 4 and 5) is grounded. GNDa is not provided right under the horizontally polarized wave antenna 312. GNDb is located in a lower layer than GNDa. GNDb is provided right under the horizontally polarized wave antenna 312. The presence of GNDb right under the horizontally polarized wave antenna 312 enables to prevent directivity from being directed toward an opposite side of the circuit board that is opposite to one surface on which the horizontally polarized wave antenna 312 is provided. Therefore, the gain in a single plane direction is improved. Also, the GNDb and the horizontally polarized wave antenna 312 may be, for example, provided with a separation distance of λ/4. This is because the GNDb is used as a reflector to increase the gain of the horizontally polarized wave antenna 312. Note that the target surface of the vehicle may be utilized as the GNDb.

The BLE transceiver 32 demodulates a signal received by the vehicle antenna 31, modulates the signal, outputs the signal to the vehicle antenna 31, and emits it as a high-frequency radio wave. The BLE transceiver 32 may also measure the reception strength of the signal received by the vehicle antenna 31, for example. The BLE transceiver 32 may determine that the signal has been received when the reception strength of the signal received by the vehicle antenna 31 is equal to or greater than a threshold. The threshold can be set arbitrarily, and a value for distinguishing between noise and signal may be set.

The control unit 33 includes a processor, a memory, an I/O, and a bus that connects these devices, and executes various processes related to an authentication in the vehicle by executing a control program stored in the memory. The memory mentioned here is a non-transitory, tangible storage medium, and stores programs and data that can be read by a computer. The non-transitory, tangible storage medium may be provided by a semiconductor memory, a magnetic disk, or the like. The control unit 33 controls transmission of signals from the vehicle antenna 31 by the BLE transceiver 32. Based on the signal received by the vehicle antenna 31, the control unit 33 identifies a positional relationship of the portable device 2 with respect to the vehicle.

The control unit 33 includes a positioning unit 331, a storage unit 332, and a reception timing determination unit 333 as functional blocks for identifying the positional relationship of the portable device 2 with respect to the vehicle. Further, a part or all of the functions executed by the control unit 33 may be configured in hardware with one or more ICs or the like. Alternatively, a part or all of the functional blocks of the control unit 33 may be realized by a combination of software executed by a processor and hardware.

The positioning unit 331 uses the high-frequency signal received by the vehicle antenna 31 to identify the positional relationship of the portable device 2 with respect to the vehicle. The positioning unit 331 corresponds to a positional relationship identification unit. The positioning unit 331 identifies a distance between the vehicle antenna 31 provided on the vehicle and the portable device 2 (hereinafter, a portable device distance) as the positional relationship of the portable device 2 with respect to the vehicle. The positioning unit 331 may identify the portable device distance based on the reception strength of the signal received by the vehicle antenna 31 and measured by the BLE transceiver 32. In this case, the positioning unit 331 may identify the portable device distance from the reception strength and the distance attenuation characteristic of the reception strength. Other than the above, the positioning unit 331 may also identify the portable device distance based on a propagation time from when a signal is transmitted from the vehicle antenna 31 to when the BLE transceiver 32 receives a response to the signal, for example.

Further, the positioning unit 331 may identify the position of the portable device 2 with respect to the vehicle by the principle of triangulation based on the portable device distances identified by each of the plurality of vehicle antennas 31. Further, in a configuration having one vehicle antenna 31 in the vehicle instead of having the plurality of vehicle antennas 31, the position of the portable device 2 may be left unidentified. Further, other configuration may also be employable, such as a one in which the positioning unit 331 does not identify the portable device distance, but based on the reception strength measured by the BLE transceiver 32 for each of the plurality of vehicle antennas 31, the position of the portable device 2 relative to the vehicle may be identified by the principle of triangulation. The positioning unit 331 may identify a rough position of the portable device 2 with respect to the vehicle based on the portable device distances identified by each of the two vehicle antennas 31.

When identifying the positional relationship of the portable device 2 with respect to the vehicle, the positioning unit 331 determines which signal to use for the identification, i.e., a signal received by which of the plurality of antennas in the vehicle antenna 31, according to a determination result of the reception timing determination unit 333.

The storage unit 332 may preferably store in advance delay characteristics of received signals for each of the antennas in the vehicle antenna 31. The antennas in the vehicle antenna 31 are the vertically polarized wave antenna 311, the first horizontally polarized wave antenna 313, and the second horizontally polarized wave antenna 314 in the present embodiment. The delay characteristics mentioned here refer to a difference in delay time that is a time from reception of the signal by the antenna to reception of the signal by the BLE transceiver 32, depending on the length of the antenna and the length from the antenna to a power supply section. The storage unit 332 may store in advance delay characteristic values obtained by simulation, experiment, or the like. The storage unit 332 may store delay characteristics for each antenna in advance for each of the plurality of vehicle antennas 31. A non-volatile memory may be used as the storage unit 332.

The reception timing determination unit 333 determines, from among the antennas in the vehicle antenna 31, which one of the antennas has received the same high-frequency signal with an earliest reception timing. In a configuration in which a plurality of vehicle antennas 31 are provided in the vehicle, an earliest receiver antenna is determined for each of the plurality of vehicle antennas 31, in terms of receiving the same high-frequency signal. The reception timing determination unit 333 may determine such an earliest receiver antenna for receiving the same high-frequency signal, from among the antennas that are instructed by the control unit 33 to transmit the signal, as the one outputting a reception signal at an earliest timing from the signal transmission instruction.

The reception timing determination unit 333 may determine, for example, by using the delay characteristics of each antenna stored in the storage unit 332 for correcting the delay of the received signal for each of the antennas, the earliest receiving antenna receiving the same high-frequency signal at the earliest reception timing. Correction of the delay may be performed by subtracting the delay time corresponding to the delay characteristics of each antenna from the propagation time described above. In such manner, it is possible to identify a more accurate propagation time, and to more accurately determine an antenna with the earliest reception timing of the same high-frequency signal. Note that when the propagation time is corrected, the corrected propagation time may be used as the propagation time for subsequent processing.

Since an in-vehicle environment is the one in which a plurality of multipaths exist, the high-frequency radio wave transmitted from the portable device 2 arrives as a plurality of radio waves with different (i.e., changed) propagation times. The change in the different propagation times is caused by the polarization. However, it is understood that the radio wave that arrives in the shortest time from the portable device 2 is the radio wave that has arrived along a path closest to an actual distance. Therefore, according to the configuration described above, it is possible to determine an antenna that has received the radio wave that enables identification of the portable device distance closest possible to the actual distance.

The positioning unit 331 may use, for example, only the high-frequency signal received by the antenna whose reception timing is determined as the earliest by the reception timing determination unit 333 among the high-frequency signals received by the antennas of the vehicle antenna 31, to identify the positional relationship of the portable device

2 with respect to the vehicle. In such manner, it is possible to use radio waves that enables identification of a portable device distance closest possible to the actual distance, thereby enabling identification of the positional relationship of the portable device 2 with respect to the vehicle with high accuracy.

<Positional Relationship Identification Related Processing in Control Unit 33>

Figure 6:
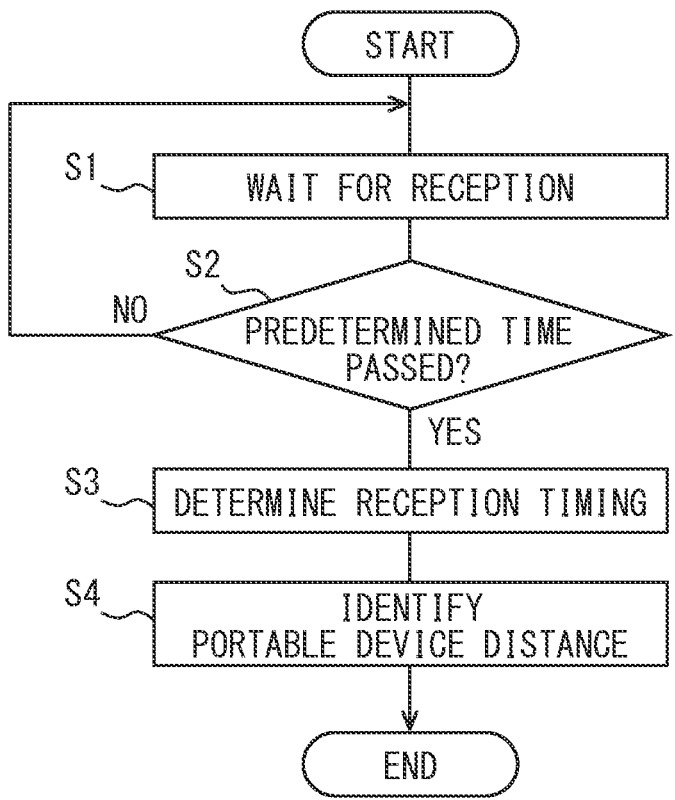
FIG. 6 is a flowchart showing an example of a flow of positional relationship identification related processing in a control unit.

Here, the processing related to identifying the positional relationship of the portable device 2 with respect to the vehicle (hereinafter referred to as positional relationship identification related processing) in the control unit 33 is described using a flowchart of FIG. 6. In an example of FIG. 6, the processing up to an identification of the portable device distance for each vehicle antenna 31 is described as the positional relationship identification related processing. The flowchart of FIG. 6 may be configured to be started when the control unit 33 requests the BLE transceiver 32 to transmit a high-frequency signal from the vehicle antenna 31. In a case where the vehicle is provided with a plurality of vehicle antennas 31, for example, the BLE transceivers 32 corresponding to those vehicle antennas 31 may be requested to transmit in order.

First, in step S1, the control unit 33 makes the BLE transceiver 32 that has requested transmission of the high-frequency signal wait for reception. When the BLE transceiver 32 is on standby for reception, the high-frequency signals received by each of the antennas in the vehicle antenna 31 are output to the BLE transceiver 32, and those with reception strengths equal to or greater than the threshold are received as target high-frequency signals.

In step S2, when a predetermined time has passed since the transmission of the high-frequency signal was requested (YES in S2), the process proceeds to step S3. The predetermined time mentioned here may be a time (i.e., a duration of time) assumed in advance within which the portable device 2 will respond in reply to the transmission of the signal from the vehicle antenna 31. On the other hand, when the predetermined time has not passed since the request for transmission of the high-frequency signal (NO in S2), the processing of S2 is repeated. In such manner, among the antennas in the vehicle antenna 31, the BLE transceiver 32 receives the signal of the antenna that can receive a high-frequency signal equal to or higher than the threshold value within a predetermined time.

In step S3, the reception timing determination unit 333 determines the earliest receiving antenna that has received the same high-frequency signal at the earliest reception timing from among the antennas in the vehicle antenna 31 based on the signal received in S2. In step S4, the positioning unit 331 identifies the portable device distance, by using only the high-frequency signal(s) received by the antenna determined to have the earliest reception timing in S3 from among the high-frequency signals received by the antennas in the vehicle antenna 31. Then, the positional relationship identification related processing is terminated.

Summary of the First Embodiment

According to the configuration of the first embodiment, it is possible to increase the number of easy-to-receive directions along which the vehicle antenna 31 that transmits and receives high-frequency signals carried on high-frequency radio waves can easily receive polarized waves to the directions of three axes orthogonal to each other. When it becomes easy to receive polarized waves in the directions of the three axes orthogonal to each other, even when having a change in the directions of the polarized waves from the portable device 2, it is easy to receive the signals with high reception strength. Therefore, even when the high-frequency signal is attenuated, it becomes easier to receive power of desired strength. As a result, even when high-frequency radio waves are used to identify the positional relationship of the portable device 2 with respect to the vehicle, it is possible to more easily receive electric power of desired strength. As a result, it is possible to identify the positional relationship of the portable device 2 with respect to the vehicle with higher accuracy.

Further, although the configuration in which the control unit 33 includes the reception timing determination unit 333 is shown in the first embodiment, the configuration is not necessarily limited to the above. For example, the reception timing determination unit 333 may be provided in the BLE transceiver 32.

Further, in the first embodiment, among the high-frequency signals received by the antennas in the vehicle antenna 31, high-frequency signals received by other antennas other than the antenna with the earliest reception timing of the same high-frequency signal may also be used to identify the portable device distance. For example, information such as the propagation time and reception strength of the high-frequency signal received by each of the antennas in the vehicle antenna 31 may be averaged and used. In such case, the weight of the information of the antenna with the earliest reception timing of the same high-frequency signal may be increased.

Second Embodiment

In the first embodiment, a configuration is shown in which the positional relationship of the portable device 2 with respect to the vehicle is identified using the high-frequency signal received by the antenna determined to have the earliest reception timing of the same high-frequency signal. However, such a configuration is not necessarily the only one. For example, a different configuration may be adopted in which the positional relationship of the portable device 2 with respect to the vehicle is identified using the high-frequency signal received by the antenna determined to have the highest reception strength of the same high-frequency signal (hereinafter, Second Embodiment). Hereinafter, the configuration of the second embodiment is described.

The vehicular system 1 of the second embodiment includes a portable device 2 carried by a user and a vehicle unit 3a used in a vehicle. The vehicular system 1 of the second embodiment is similar to the vehicular system 1 of the first embodiment, except that a vehicle unit 3a is included instead of the vehicle unit 3.

<Schematic Configuration of Vehicle Unit 3a>

Figure 7:
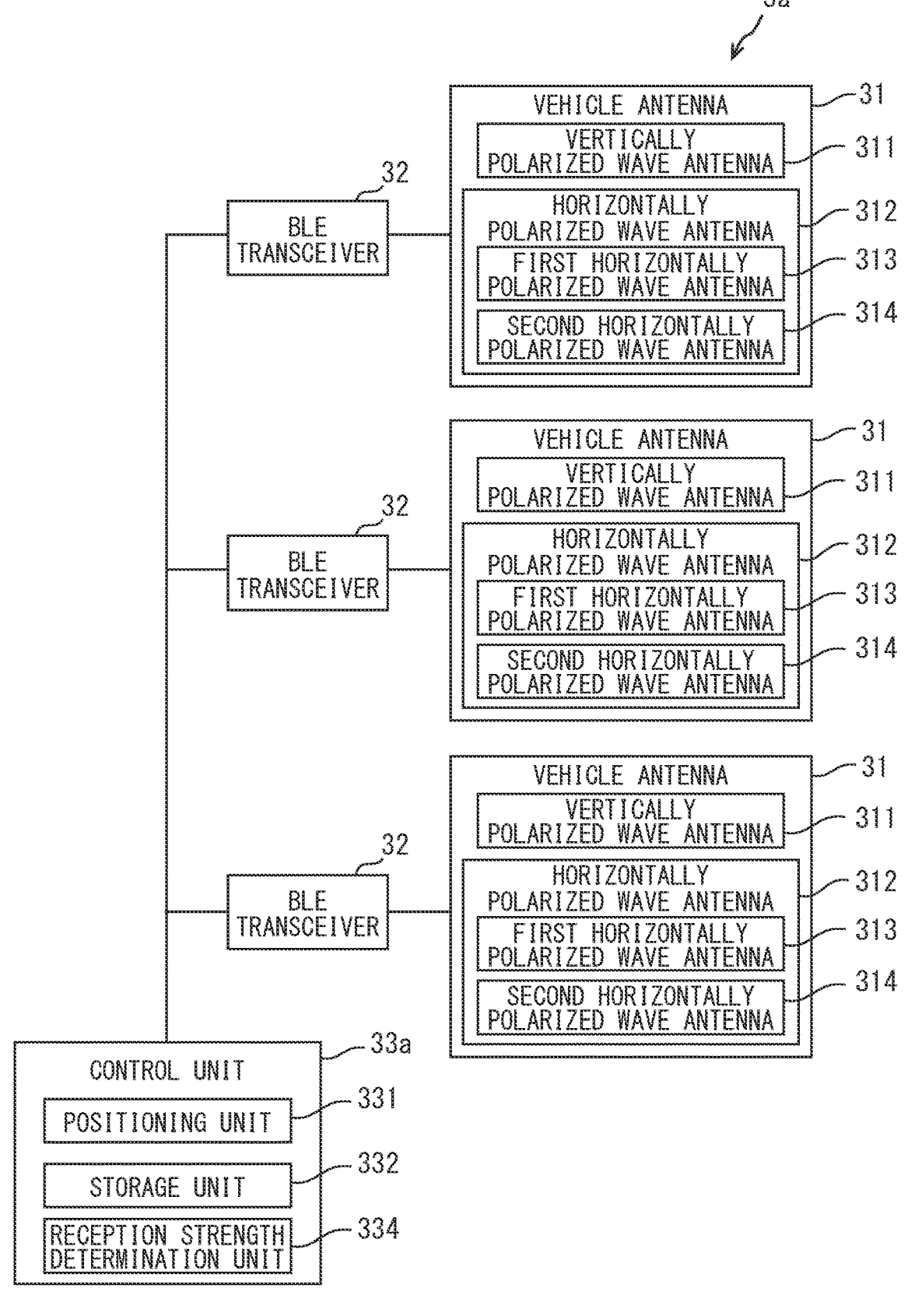
FIG. 7 is a diagram showing an example of a schematic configuration of a vehicle unit.

Next, a schematic configuration of the vehicle unit 5 is described with reference to FIG. 7. As shown in FIG. 7, the vehicle unit 3a includes the vehicle antenna 31, the BLE transceiver 32, and the control unit 33a. The vehicle unit 3a is the same as the vehicle unit 3 of the first embodiment, except that a control unit 33a is provided instead of the control unit 33.

The control unit 33a includes the positioning unit 331, the storage unit 332, and a reception strength determination unit 334 as functional blocks for identifying the positional relationship of the portable device 2 with respect to the vehicle. The control unit 33a is the same as the control unit 33 of the first embodiment, except that the reception timing determination unit 333 is replaced by a reception strength determination unit 334.

The reception strength determination unit 334 determines an antenna having the highest reception strength of the same high-frequency signal among the antennas in the vehicle antenna 31. In case of having a configuration in which a plurality of vehicle antennas 31 are provided in the vehicle, the antenna with the highest reception strength of the same high-frequency signal is determined for each of the plurality of vehicle antennas 31. The reception strength determination unit 334 may determine, from among the antennas in the vehicle antenna 31 for which the control unit 33a has instructed transmission, a highest-reception-strength antenna as the one having the highest reception strength measured by the BLE transceiver 32. The BLE transceiver 32 may measure the reception strength of each of the antennas in the vehicle antenna 31. In the second embodiment, this processing may be performed instead of the processing of S3 among the positional relationship identification related processing described with reference to FIG. 6.

A radio wave with high reception strength may be understood as a radio wave with high reliability. Therefore, even with the above configuration, it is possible to determine an antenna that has received the radio wave that enables identification of the portable device distance that is closest possible to the actual distance.

The positioning unit 331 may preferably identify, by using only the high-frequency signal received by the antenna determined to have the highest reception strength by the reception strength determination unit 334 out of the high-frequency radio waves received by the antennas in the vehicle antenna 31, the positional relationship of the portable device 2 with respect to the vehicle. In the second embodiment, the above-described processing may be performed instead of the processing of S4 among the positional relationship identification related processing described with reference to FIG. 6. In such manner, it is possible to use radio waves that can identify a portable device distance closest possible to the actual distance, thereby enabling identification of the positional relationship of the portable device 2 with respect to the vehicle with high accuracy.

Further, although the configuration in which the control unit 33a includes the reception strength determination unit 334 is shown in the second embodiment, the configuration is not necessarily limited to the above. For example, the BLE transceiver 32 may be provided with the reception strength determination unit 334.

Further, in the second embodiment, of the high-frequency signals received by the antennas in the vehicle antenna 31, high-frequency signals received by antennas other than the antenna having the highest reception strength of the same high-frequency signal may also be used to identify the portable device distance. For example, information such as the propagation time and reception strength of the high-frequency signal received by each of the antennas in the vehicle antenna 31 may be averaged and used. In such case, the weight of the information of the antenna having the highest reception strength of the same high-frequency signal may be increased.

Third Embodiment

Although the configuration in which the horizontally polarized wave antenna 312 includes the first horizontally polarized wave antenna 313 and the second horizontally polarized wave antenna 314 is shown in the above-described embodiments, the configuration is not necessarily limited to the above. For example, a configuration using a circularly polarized wave antenna instead of the first horizontally polarized wave antenna 313 and the second horizontally polarized wave antenna 314 (hereinafter, Third Embodiment) may also be employed. Hereinafter, the configuration of the third embodiment is described.

The vehicular system 1 of the third embodiment includes the portable device 2 carried by a user and a vehicle unit 3*b* used in a vehicle. The vehicular system 1 of the third embodiment is similar to the vehicular system 1 of the first embodiment, except that the vehicle unit 3*b* is included instead of the vehicle unit 3.

<Schematic Configuration of Vehicle Unit 3*b*>

Figure 8:
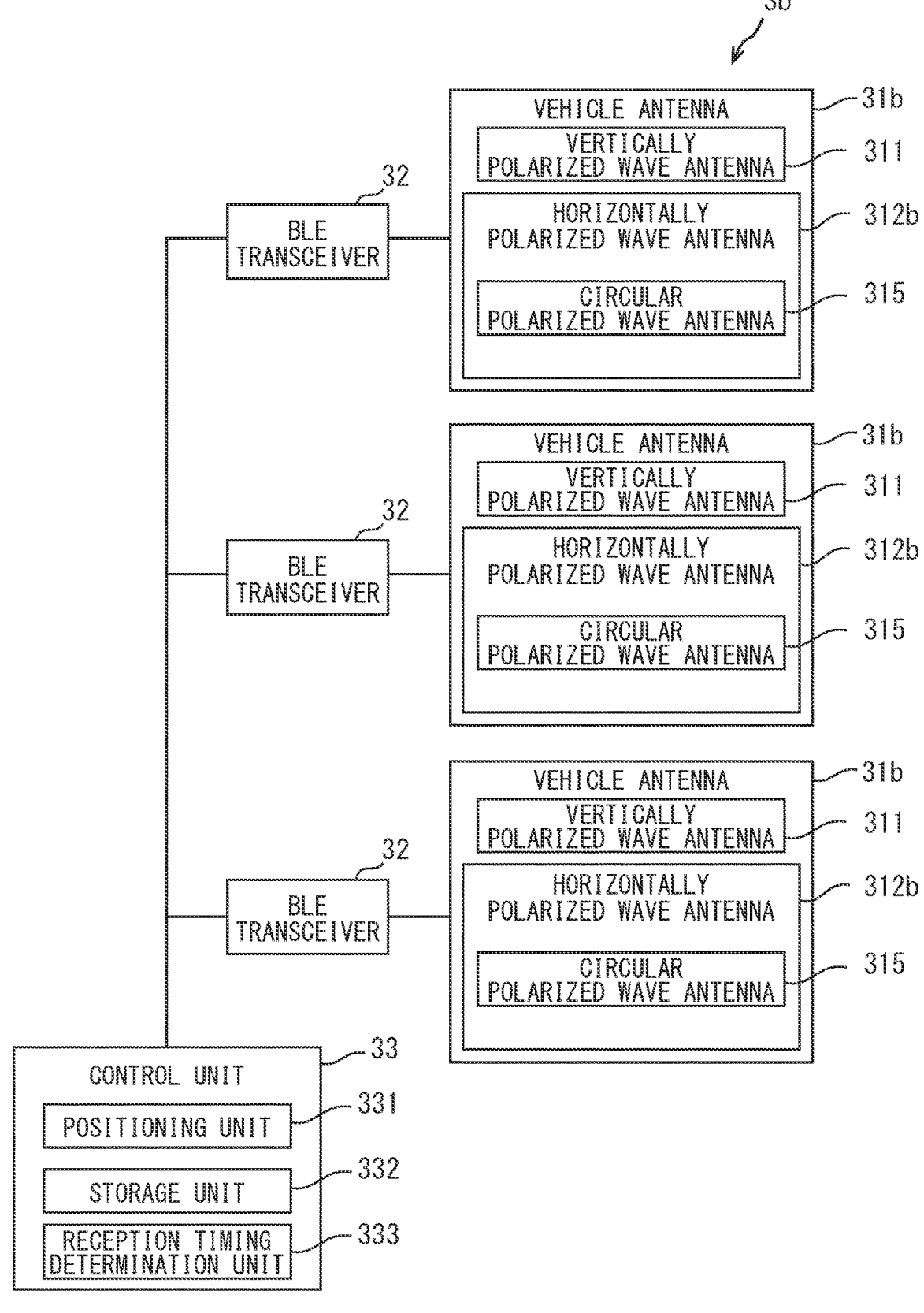
FIG. 8 is a diagram showing an example of a schematic configuration of a vehicle unit.

Next, a schematic configuration of the vehicle unit 3*b* is described with reference to FIG. 8. As shown in FIG. 8, the vehicle unit 3*b* includes a vehicle antenna 31*b*, the BLE transceiver 32, and the control unit 33, as shown in FIG. 8. The vehicle unit 3*b* is the same as the vehicle unit 3 of the first embodiment, except that the vehicle antenna 31*b* is provided instead of the vehicle antenna 31.

The vehicle antenna 31*b* has the vertically polarized wave antenna 311 and a horizontally polarized wave antenna 312*b*. The vehicle antenna 31*b* is the same as the vehicle antenna 31 of the first embodiment except that it has a horizontally polarized wave antenna 312*b* instead of the horizontally polarized wave antenna 312. A circularly polarized wave antenna 315 is provided as the horizontally polarized wave antenna 312*b*. The circularly polarized wave antenna 315 is an antenna capable of transmitting and receiving polarized waves, which are mutually orthogonal to each other and horizontal to the target surface.

According to the configuration of the third embodiment, instead of using two antennas, one circularly polarized wave antenna 315 can transmit and receive polarized waves that are horizontal to the target surface and orthogonal to each other. Therefore, it is possible to reduce the configuration of the transceiver antenna of an RF switch or the like, by the amount of configuration otherwise required for such device.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. Further, the control unit and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit. Alternatively, the device and the method thereof described in the present disclosure may also be implemented by one or more dedicated computers configured as a combination of a processor executing a computer program and one or more hardware logic circuits. Further, the computer program may also be stored in a computer-readable, non-transitory, tangible storage medium as instructions to be executed by a computer.

What is claimed is:

1. A vehicle unit installable and usable in a vehicle, the vehicle unit comprising:

an antenna portion configured to transmit and receive a high-frequency signal carried on a high-frequency radio wave, the high-frequency radio wave being a radio wave of 1 GHz or higher, wherein the antenna portion at least includes a vertically polarized wave antenna configured to transmit and receive a polarized wave orthogonal to a target surface, which is a metal surface of a predetermined part of the vehicle, and one or two horizontally polarized wave antennas configured to transmit and receive polarized waves that are horizontal to the target surface and orthogonal to each other, the vehicle unit further comprising:

a positional relationship identification unit configured to identify a positional relationship of a portable device with respect to the vehicle, which is configured to transmit the high-frequency signal, with respect to the vehicle, by using the high-frequency signal received by the antenna portion, the positional relationship of the portable device with respect to the vehicle being a distance between the antenna portion provided on the vehicle and the portable device; and a reception strength determination unit configured to determine an antenna having a highest reception strength of a same high-frequency signal from among the antennas of the antenna portion, wherein the positional relationship identification unit is configured to identify the positional relationship of the portable device with respect to the vehicle by using only the high-frequency signal received by the antenna, which is determined by the reception strength determination unit to have the highest reception strength among the antennas included in the antenna portion.

2. The vehicle unit of claim 1, wherein the antenna portion is of a plurality of antenna portions, and the plurality of antenna portions are respectively disposed on different target surfaces of a same vehicle.

3. The vehicle unit of claim 1, wherein the antenna portion includes, as the horizontally polarized wave antenna, a first horizontally polarized wave antenna configured to transmit and receive a horizontally polarized wave that is horizontal with respect to the target surface, and a second horizontally polarized wave antenna configured to transmit and receive a horizontally polarized wave that is horizontal with respect to the target surface and orthogonal to the polarized wave of the first horizontally polarized wave antenna.

4. The vehicle unit of claim 1, wherein the antenna portion includes, as the horizontally polarized wave antenna, one circularly polarized wave antenna configured to transmit and receive polarized waves that are horizontal to the target surface and orthogonal to each other.

5. The vehicle unit of claim 1, wherein the vertically polarized wave antenna is a 0th-order resonance antenna.

6. The vehicle unit of claim 1, wherein the antenna portion is provided above the target surface, and a ground layer is formed right under the horizontally polarized wave antenna as one of lower layers positioned closer to the target surface than a layer on which the horizontally polarized wave antenna is provided.

7. The vehicle unit of claim 1, wherein the antenna portion is provided at a distance of $\lambda/4$ away from the target surface.

8. A positional relationship identification system comprising:

the vehicle unit of claim 1; and the portable device configured to be carried by a user and transmit and receive the high-frequency signals carried on high-frequency radio waves.

9. The vehicle unit of claim 1, wherein:

the antenna portion is of a plurality of antenna portions;

the plurality of antenna portions are respectively disposed on different target surfaces of a same vehicle; and the positional relationship identification unit is configured to identify a position of the portable device with respect to the vehicle by a principle of triangulation based on the identified distance between each of the antenna portions and the portable device.

10. The vehicle unit of claim 1, wherein:

the positional relationship identification unit is configured to identify the positional relationship by not using a high-frequency signal received by the antenna, that is determined by the reception strength determination unit to have a lower reception strength than the highest reception strength among the antennas included in the antenna portion.

\* \* \* \* \*